May 20, 1947. F. C. MOCK 2,420,899
ENGINE FUEL CONTROL
Filed June 20, 1932
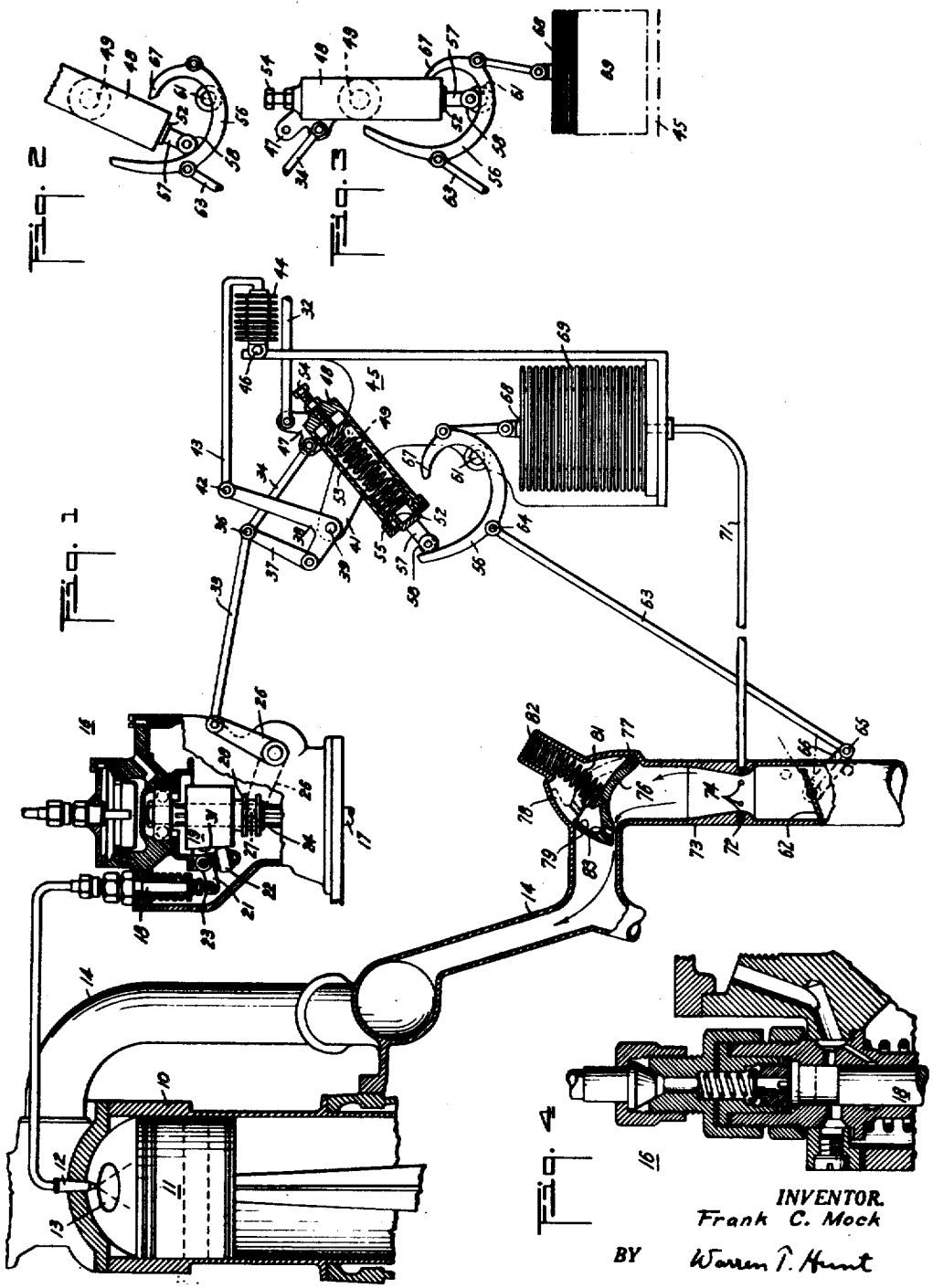
INVENTOR.
Frank C. Mock
BY Warren T. Hunt
ATTORNEY.

Patented May 20, 1947

2,420,899

UNITED STATES PATENT OFFICE 2,420,899

ENGINE FUEL CONTROL

Frank C. Mock, Montclair, N. J., assignor, by mesne assignments, to Eclipse Aviation Corporation, East Orange, N. J., a corporation of New Jersey Application June 20, 1932, Serial No. 618,380

25 Claims. (Cl. 123—139)

This invention relates to internal combustion engines, and more particularly to a fuel mixture control therefor.

The invention is shown as embodied in an internal combustion engine of the fuel injection type, as distinguished from the type in which fuel is drawn into the engine by the suction in the intake manifold.

Heretofore, in engines of this type, difficulties have been encountered in the coordination of the fuel supply with the air supply under varying speed and load conditions. In the present invention these difficulties have been obviated by a novel mechanism in which the fuel injection is controlled by the operator and the air supply is automatically controlled in accordance with the engine requirements, a device responsive to both the static and velocity pressures of the engine intake manifold being preferably included which varies the effect of the automatic control in accordance with the fuel control position.

An important feature of the invention relates to a manual control of the positively driven fuel pump to which is inter-connected a resilient member adapted to resist the opening of a suction controlled air valve.

Another feature of the invention relates to a novel pressure actuated valve for controlling the action of the air throttle valve, a pressure actuated valve being preferably arranged in the manifold intermediate the engine and the throttle valve. The pressure actuated valve also preferably includes a passage therethrough whereby the velocity of the air passing through the manifold is utilized to reduce the pressure behind the valve and permit it to open to a greater extent than has been obtainable heretofore.

An object of the invention is to provide a control for an internal combustion engine of the fuel injection type in which the fuel and air are properly proportioned irrespective of engine speed and load.

Another object of the invention is to provide a control for an engine of the fuel injection type in which the fuel supply is under manual control and the air supply is controlled preferably by a balanced valve movable in accordance with the manifold suction or depression, the action of which is modified by the position of the fuel control.

Another object of the invention is to provide a control for the air supply of a fuel injection engine in which the control valve is opened by manifold suction and closed by a resilient member movable in accordance with the position of the fuel control.

Another object of the invention is to provide a barometric control of the fuel injection pump.

Another object of the invention is to provide a velocity actuated valve for modifying the action of a suction controlled valve, the velocity actuated valve incorporating novel means for causing the valve to impose no obstructions to air flow through the manifold when the valve is in the wide open position.

Another object of the invention is to provide a fuel injection engine in which the fuel control operates to vary the force tending to close a suction actuated air valve.

Another object of the invention is to provide a fuel injection engine in which the fuel may be injected into the engine by operation of a manual pump control when the engine is not operating.

Other objects and features of the invention will be apparent from the following description, in connection with which a preferred embodiment of the invention has been illustrated in the accompanying drawings, in which:

Fig. 1 is a somewhat diagrammatical sectional view illustrating the arrangement and details of the improved fuel mixture control;

Fig. 2 is a view showing the relative position of the automatic control operating lever and the resilient opposing member when the fuel control is in the half open position;

Fig. 3 shows the position of the same parts when the fuel control is in the full open position.

Fig. 4 is an enlarged fragmentary sectional view of a portion of the pump.

Referring to the drawings, 10 represents the engine cylinder in which reciprocates piston 11, fuel being supplied through nozzle 12 and the air being supplied through valve 13 and intake manifold 14. The fuel is positively forced to nozzle 12 by a pump generally designated as 16, which is engine driven by means of shaft 17. The pump comprises a reciprocating plunger 18 actuated by a rotatable cam 19 through bell crank 21 having a roller 22 in contact with cam 19 and a nose 23 in contact with the lower end of the plunger 18. Cam 19 is preferably splined to the shaft 17, as shown at 24, and is axially slidable thereon by means of a bell crank 26, one arm of which is bifurcated and provided with pins 27 interposed between the opposite faces of collar 28. Variation in the pump capacity is obtained by movement of the cam 19 which is provided with a tapered face 31, and in the form shown the pump will deliver the greatest quantity of fuel per stroke when the cam is in its lowermost position. Bell crank 26 is interconnected with the manual control rod 32 by rods 33 and 34 forming a toggle having a hinge connection at 36, to which is secured a link 37 connected to bell crank 38 having a pivotal connection at 39 with an arm 41 of a fixed supporting means 45. The upper end of bell crank 38 is pivotally connected at 42 to rod 43 that is secured to an expansible barometric device 44, preferably pivotally secured to the fixed part 45 at 46. Rod 34 is pivotally secured to ears 47 of a cylinder 48 pivotally mounted at 49 upon fixed part 45. A piston 52 is slidably mounted within cylinder 48 and urged outwardly by spring 53, which may be adjusted by screw 54. Piston 52 is secured within the cylinder by cap 55 and has its lower end provided with an extension 57 having a roller 58 in slidable contact with lever 59 pivotally mounted at 61 on member 45. Lever 56 is preferably of a curved form whereby roller 58 will apply its force normally to the lever surface but, if desired, may be of any other shape.

Lever 56 is connected with the manifold throttle valve 62 by a linkage including rod 63 having a pivotal connection with the lever 56 at 64 and a pivotal connection at 65 with the throttle actuating lever 66. Lever 56 is provided with an extension 67 adapted to contact with cylinder 48 and to positively open throttle valve 62 when the cylinder is moved to the position shown in Fig. 3, which position corresponds to the lowest position of the pump cam 19. Lever 56 is also pivotally connected to the top wall 68 of a collapsible member 69, the interior of which is in communication with manifold 14 by means of pipe 71 having communication with a passage 72 formed on the outer periphery of venturi 73, the groove having communication with the interior of the manifold through holes 74. The Venturi tube is very desirable in most cases, for at high engine speeds the pressure in the engine during the intake stroke may be much less than in the manifold because of the restriction of valve 13. If a venturi is used in the manner shown, the pressure acting on the bellows 69 will be a function of both the rarefaction and the velocity through the venturi, which will compensate for the aforesaid difference in pressure due to valve restriction. A valve 76 is preferably hinged to the manifold 14 at 77 and adapted to be opened by air pressure into a recess or chamber 78, the side walls of the valve 76 preferably being in contact with the side walls of the recess and the extension 79 being provided to substantially close the end of the recess in all positions of the valve. If desired, valve 76 may be urged to its closed position by a spring 81 coacting between valve 76 and the end wall of the recess extension 82. An opening 83 is preferably provided in the valve 76 which is inclined slightly in the direction of air movement, whereby the chamber 78 behind the valve 76 will be subjected to the influence of the air flow passing through the manifold 14. Valve 76 is preferably formed of considerable weight, whereby its inertia will prevent rapid movements of the valve. In valves of this type they ordinarily assume a position whereby they cause some obstruction to the passage of air through the manifold, but in the valve disclosed the flow of air through the manifold at high speed will so reduce the pressure in chamber 78 that it has been found that the valve will be moved entirely out of the air passage and will impose no obstruction to the air flow.

In the operation of the device, assuming that the engine is running at slow speed, the parts will be in the position shown in Fig. 1 wherein cam 19 has been moved to its upper position and a minimum amount of fuel is injected into the cylinder at each stroke of the pump. The cylinder 48 has been rocked to the position shown and because the roller 58 contacts lever 56 at a maximum distance from the pivotal axis 61, the bellows 69 will be opposed by a greater force from spring 53 and the throttle lever 62 will be slightly opened, as shown.

If for any reason the load on the engine should be decreased, the speed of both engine and fuel pump will increase, which will require a greater amount of air to be admitted to maintain the correct proportions of fuel to air. This proportion will be maintained in its present construction by the increased vacuum in manifold 14 which will be transmitted to the interior of the bellows 69 and cause a greater force to be exerted against spring 53. If it is desired to increase the power output of the engine, the cam 19 is moved downwardly by movement of the manual control rod 32 and cylinder 48 will be rocked in a counterclockwise direction to a position such as is shown in Fig. 2, in which case the distance between the pivotal point 61 and the roller 58 is shortened and the throttle 62 will be opened further by the action of the bellows 69. If the fuel pump control be moved to its maximum position, the cylinder 48 will be rocked still further to the right to the position shown in Fig. 3, wherein the cylinder contacts with the end 67 of lever 56 and positively holds or moves throttle valve 62 to its wide open position.

At anything less than the full capacity of the pump, valve 76 will assume some intermediate position between the broken line position and the full line position illustrated in Fig. 1, but because of the weight of this valve, sudden fluctuations in manifold pressures will not be transmitted to the bellows 69 which will cause the automatic throttle valve 62 to be more uniform in its action and will prevent the engine from momentarily operating on an incorrect mixture. Under conditions wherein there is a high velocity of air flow through manifold 14, valve 76 will assume the position shown in broken lines in Fig. 1, which position is assumed because of the impingement of the air upon the curved portion of the valve, and also because the passage 83 is so arranged that the venturi action of the valve 76, which is preferably curved in form, will exhaust the chamber 78 to a pressure substantially the same as that existing at the manifold end of passage 83.

The chamber 78 and passage 83 are ordinarily not used with valves of this type, but it has been found that if they are omitted, the pressure behind the valve is greater than that existing at the down stream end of the valve, which causes the valve to assume a position somewhat spaced from the manifold walls. This difficulty is reduced by the present design, and the valve will assume substantially the position shown in broken lines in Fig. 1. The passage 83 is inclined to the face of the valve which is curved adjacent the orifice to produce an eddy adjacent thereto. The eddy causes a lowering of static pressure which exhausts the chamber 78 below the static pressure within the manifold, therefore at high velocities the valve is wide open because of the reduced pressure behind it and does not materially restrict the air flow through the manifold. It will also be noted that when valve 76 is projected within the manifold the orifice 83 communicates with a restricted portion of the manifold whereat the static pressure is reduced by the increased velocity and as the static pressure behind valve 76 is less than the static pressure within the manifold, the valve will be forced inwardly by static pressure as well as by the impact of the air upon the face of the valve.

The barometric device 44 has been incorporated to provide an automatic barometric correction for altitude conditions if the engine be used in an airplane. The arrangement of the barometric device is such that upon a decrease in atmospheric pressure, the sealed gases confined in the bellows will expand and force the toggle joint 36 in an upward direction, whereby the effective distance between lever 26 and ears 47 is shortened and cam 19 is pushed upwardly to reduce the fuel pump capacity an amount sufficient to compensate for the reduced amount of air passing through the manifold 14. An increase in air pressure moves lever 38 in an anti-clockwise direction and increases the amount of fuel pumped at each rotation of cam 19. The barometric device 14 operates only to compensate for decreased or increased atmospheric pressure, and at all times cam 19 is under the control of the operator.

It may be noted that in the present arrangement, even though the engine be at rest, cam 19 may be moved up and down to actuate plunger 18, which will cause fuel to be injected into cylinder 10 and for starting purposes the engine may be primed with fuel while it is not operating.

While a preferred embodiment of the invention has been illustrated and described, it is understood that this showing and description are illustrative only, and that the invention is not limited to the form shown and described, or otherwise, except by the terms of the following claims.

What is claimed is:

1. In a fuel mixture control for a fuel injection engine, a fuel pump adapted to be driven in timed relation to the engine, means for controlling the fuel capacity of the pump, an air manifold, a balanced valve therein, means responsive to manifold suction for actuating the valve, and resilient means opposing the valve opening, said means being movable with the pump control and cooperative with the suction responsive means to vary the effect of the same upon the valve.

2. In a fuel mixture control for a fuel injection engine, a fuel pump adapted to be driven in timed relation to the engine, means for controlling the fuel capacity of the pump, an air manifold, a balanced valve therein, means responsive to manifold suction for actuating the valve, resilient means opposing the valve opening, said means being movable with the pump control and adapted to decrease the opposing force as the capacity of the pump is increased.

3. In a fuel mixture control for a fuel injection engine, a fuel pump adapted to be driven in timed relation to the engine, means for controlling the fuel capacity of the pump, an air manifold, a balanced valve therein, means responsive to manifold suction for actuating the valve, resilient means opposing the valve opening, said means being movable with the pump control, and means for positively opening the air valve when the pump control is moved toward the maximum pumping position.

4. In a fuel mixture control for an engine, a fuel pump, an air intake conduit, a valve therein, means including a pivoted lever for moving said valve in accordance with intake conduit pressure, a manual control for the fuel pump, and a pivoted member rotatable by the fuel control resiliently pressing on the lever adapted to contact the lever at varying distances from the lever axis according to the fuel control position.

5. In a fuel mixture control for an engine, a fuel pump, an air intake conduit, a valve therein, means including a pivoted lever for moving said valve in accordance with intake conduit pressure, a manual control for the fuel pump, a pivoted member rotatable by the fuel control resiliently pressing on the lever adapted to contact the lever at varying distances from the lever axis according to the fuel control position, and means on the lever adapted to be contacted by the member to positively open the valve.

6. In combination with an internal combustion engine, an intake valve therefor, an engine driven fuel pump having a variable capacity, a manual control therefor, a manifold having a throttle valve, an automatic valve control connected with the throttle valve and responsive to the differential between atmospheric and manifold pressures for moving the valve, means movable with the pump control to vary the effect of the valve control in a manner to decrease its valve opening action as the fuel is decreased and a spring pressed valve actuated by manifold air flow between the engine intake valve and throttle valve for damping out fluctuations in manifold pressure.

7. In combination with an internal combustion engine, an engine driven fuel pump having a variable capacity, a manual control therefor, a manifold having a throttle valve, an automatic valve control responsive to the differential between atmospheric and manifold pressures, means movable with the pump control to vary the effect of the valve control in a manner to decrease its valve opening action as the fuel is decreased, a recess in the wall of the manifold intermediate the engine and throttle, and a spring pressed valve in said manifold actuated by air flow therein for damping out fluctuations in manifold pressure, said valve being adapted to lie within said recess when said valve is in the open position.

8. In combination with an internal combustion engine, an intake valve therefor, a fuel pump, a manual control therefor, a manifold, a suction operated throttle valve therein, and an air velocity actuated valve between the engine intake valve and throttle valve for damping out fluctuations in manifold pressure.

9. In combination with an internal combustion engine, a fuel pump, a manual control therefor, an air passage, a suction operated valve therein, a spring pressed pressure actuated valve between the engine and throttle valve adapted to restrict air flow in the air passage, said air passage having a recess for receiving said valve, an orifice in the valve communicating with the recess behind the valve, and means on the valve for producing an eddy current of air adjacent the orifice whereby the pressure in the recess is reduced and the valve is forced into the recess at high air velocities by reason of air flow through the manifold.

10. In an internal combustion engine, an intake passage, a spring pressed pressure actuated valve adapted to restrict air flow therein arranged in the passage in a manner to be opened by air flow, and said valve having an opening therethrough arranged adjacent the restricted air flow for reducing the pressure behind the valve whereby the valve is urged toward an open position by air pressure.

11. In a fuel and air system for an engine having a manifold, a manual fuel control, a balanced valve for controlling air flow through the manifold, means responsive to manifold suction for controlling the valve, and means movable with the fuel control coacting with the suction responsive means to vary the effect of the suction responsive means upon the air valve in a manner to increase the air supply as the fuel supply is increased.

12. In a fuel and air system for an engine having a manifold, a manual fuel control, a balanced valve for controlling air flow through the manifold, means responsive to manifold suction for moving said valve to open and closed positions, resilient means opposing movement of said valve in one direction, and means operatively connecting the resilient means with the fuel control to move the resilient means and decrease its opposing effect in accordance with movement of the fuel control to increase the fuel supply.

13. In a fuel and air system for an engine having a manifold, a manual fuel control, a balanced valve in the manifold for controlling air flow therethrough, said valve being rotatable about a diametral axis, means responsive to manifold suction for moving said valve about its axis including a lever, resilient means opposing movement of said lever in the valve opening direction and movable along said lever to vary the mechanical advantage of the resilient means, means connecting the resilient means with the fuel control, and said connecting means being arranged to decrease the mechanical advantage of the resilient means as the fuel supply is increased.

14. In combination with an internal combustion engine, a fuel pump having a variable capacity, a manual control for the pump, an air intake manifold, a valve therein, valve control means including a container having a movable end wall, said wall having its inner side exposed to manifold pressure and its outer side exposed to atmospheric pressure, means including a pivoted lever connecting the end wall to the valve for actuating the same, movable resilient means cooperative with the lever to oppose movement of the end wall toward a decreased container volume position, a linkage connecting the pump control with the resilient means to vary the mechanical advantage of the resilient means with respect to the lever and in accordance with movement of the pump control in a manner to decrease the mechanical advantage as the fuel is increased, and a barometric device adapted to vary the effective length of the linkage in a manner to decrease the ratio of fuel to air as the atmospheric pressure is decreased.

15. In combination with an internal combustion engine, an engine driven fuel pump having a variable pumping capacity, a manual control therefor, a manifold having a throttle valve, an automatic valve control responsive to the differential between atmospheric and manifold pressures in a manner to open the valve with a decrease in manifold pressure, said valve control including a pivoted lever, resilient means operable on the lever to oppose opening movement of the valve, and means movable by the pump control to decrease the mechanical advantage of the resilient means as the pumping capacity of pump is increased.

16. In an internal combustion engine, a fuel pump, a manual control therefor, a manifold, a valve therein, an automatic air control, a pivoted lever having one portion operatively connected with the air control and another portion operatively connected with the valve, said air control being arranged to open said valve as the manifold pressure is decreased, resilient means operatively connected with the pump control and cooperative with the lever to oppose movement of the lever toward an open position of the valve, said resilient means being movable along the lever to increase its opposing action as the pump control is moved toward a decreased fuel position, and atmospheric pressure controlled means connected with the pump control and arranged to decrease the fuel as the atmospheric pressure decreases.

17. In a fuel and air system for an engine having an intake manifold, a fuel control, a balanced valve for controlling air flow in the manifold, means responsive to manifold suction for controlling the valve, and means operated concurrently with the fuel control to vary the effect of the suction responsive means in a manner to decrease the air supply as the fuel supply is decreased.

18. In a fuel and air system for an engine having an intake manifold, a fuel control, a balanced valve for controlling air flow in the manifold, and valve regulating means connected to the valve to open and close the same, said regulating means being controlled by the joint action of manifold suction and the movement of the fuel control to move the valve to increase the air as the fuel is increased and maintain a substantially constant ratio of fuel to air irrespective of variations in the fuel supply and the manifold suction.

19. In a fuel and air system for an engine having a manifold, a manual fuel control, an air control including a balanced valve and means responsive to manifold suction for opening said valve, said air control including a pivoted lever arranged to actuate the valve, and a resilient member contacting the lever to urge the same to close the valve, means operatively connecting said resilient member with the fuel control, and said resilient member being slidable along the lever to vary the mechanical advantage of the suction means with respect to the air control.

20. In combination with an internal combustion engine, a fuel pump having a variable capacity, a manual control therefor, an air intake manifold, a valve therein, valve control means including a container having a movable end wall, said wall having its inner side subjected to manifold pressure and its outer side exposed to atmospheric pressure, means including a pivoted lever connecting the wall to the valve for actuating the same, and resilient means movable with the pump control and cooperative with the lever to resist movement of the same in one direction, said resilient means being movable along the lever to increase the mechanical advantage of the resilient means with respect to the lever when the manual control is moved toward a decreased fuel position.

21. In combination with an internal combustion engine, a fuel pump having a variable capacity, a manual control therefor, an air intake manifold, a valve therein, valve control means including a container having a movable end wall, said wall having its inner side subjected to manifold pressure and its outer side exposed to atmospheric pressure, means including a pivoted lever connecting the wall to the valve for actuating the same, resilient means opposing said lever movement in the valve opening direction, said means being movable with the pump control and cooperative with the lever to vary the mechanical advantage of the resilient means with respect to the lever, and barometric means for controlling the cooperative relation between the pump and the valve control.

22. In combination with an internal combustion engine, a fuel supplying device having a supply control, manual means for controlling the fuel supply, an air intake manifold, a valve therein, valve control means including a container having a movable wall, said wall having its inner side exposed to manifold pressure and its outer side exposed to atmospheric pressure, means including a pivoted lever connecting the wall to the valve for actuating the same, resilient means opposing said lever movement in the valve opening direction, said resilient means being movable with the fuel supply controlling means and cooperative with the lever to vary the mechanical advantage of the resilient means with respect to the lever, and barometric means for controlling the cooperative relationship between the fuel supply means and the air valve control.

23. In combination with an internal combustion engine, a fuel supplying device having a supply control, manual means for controlling the fuel supply, an air intake manifold, a valve therein, valve control means including a container having a movable wall, said wall having its inner side exposed to manifold pressure and its outer side exposed to atmospheric pressure, means including a pivoted lever connecting the wall to the valve for actuating the same, resilient means opposing said lever movement in the valve opening direction, said resilient means being movable with the fuel supply controlling means and cooperative with the lever to vary the mechanical advantage of the resilient means with respect to the lever, and barometric means for reducing the fuel supply as the atmospheric pressure is reduced.

24. In a fuel and air system for an engine, a fuel control, an air control, means responsive to manifold pressure for actuating the air control, and means operated concurrently with the fuel control to vary the effect of the pressure responsive means in a manner to decrease the air supply as the fuel supply is decreased.

25. In a fuel and air system for an engine, a fuel control, an air control, means responsive to manifold pressure for actuating the air control, and means operated concurrently with the fuel control to vary the effect of the pressure responsive means on the air control.

FRANK C. MOCK.

REFERENCES CITED

The following references are of record in the file of this patent:

UNITED STATES PATENTS

| Number | Name | Date |
|---|---|---|
| 1,718,856 | Schmidt | June 25, 1929 |
| 1,098,783 | Daimler | June 2, 1914 |
| 1,759,187 | Davidson | May 29, 1930 |

FOREIGN PATENTS

| Number | Country | Date |
|---|---|---|
| 147,731 | Great Britain | Oct. 10, 1921 |
| 402,567 | Germany | Sept. 19, 1924 |
| 494,713 | France | Sept. 17, 1919 |
| 291,152 | Great Britain | May 24, 1928 |
| 147,475 | Great Britain | Nov. 8, 1921 |
| 15,170 | Great Britain | May 3, 1912 |

Certificate of Correction

Patent No. 2,420,899. May 20, 1947.

FRANK C. MOCK

It is hereby certified that error appears in the printed specification of the above numbered patent requiring correction as follows:

Column 6, line 62, claim 9, strike out the words "by reason of air flow through the manifold";

and that the said Letters Patent should be read with this correction therein that the same may conform to the record of the case in the Patent Office.

Signed and sealed this 7th day of December, A. D. 1948.

[SEAL]

THOMAS F. MURPHY,
*Assistant Commissioner of Patents.* the cooperative relation between the pump and the valve control.

22. In combination with an internal combustion engine, a fuel supplying device having a supply control, manual means for controlling the fuel supply, an air intake manifold, a valve therein, valve control means including a container having a movable wall, said wall having its inner side exposed to manifold pressure and its outer side exposed to atmospheric pressure, means including a pivoted lever connecting the wall to the valve for actuating the same, resilient means opposing said lever movement in the valve opening direction, said resilient means being movable with the fuel supply controlling means and cooperative with the lever to vary the mechanical advantage of the resilient means with respect to the lever, and barometric means for controlling the cooperative relationship between the fuel supply means and the air valve control.

23. In combination with an internal combustion engine, a fuel supplying device having a supply control, manual means for controlling the fuel supply, an air intake manifold, a valve therein, valve control means including a container having a movable wall, said wall having its inner side exposed to manifold pressure and its outer side exposed to atmospheric pressure, means including a pivoted lever connecting the wall to the valve for actuating the same, resilient means opposing said lever movement in the valve opening direction, said resilient means being movable with the fuel supply controlling means and cooperative with the lever to vary the mechanical advantage of the resilient means with respect to the lever, and barometric means for reducing the fuel supply as the atmospheric pressure is reduced.

24. In a fuel and air system for an engine, a fuel control, an air control, means responsive to manifold pressure for actuating the air control, and means operated concurrently with the fuel control to vary the effect of the pressure responsive means in a manner to decrease the air supply as the fuel supply is decreased.

25. In a fuel and air system for an engine, a fuel control, an air control, means responsive to manifold pressure for actuating the air control, and means operated concurrently with the fuel control to vary the effect of the pressure responsive means on the air control.

FRANK C. MOCK.

REFERENCES CITED

The following references are of record in the file of this patent:

UNITED STATES PATENTS

| Number | Name | Date |
| --- | --- | --- |
| 1,718,856 | Schmidt | June 25, 1929 |
| 1,098,783 | Daimler | June 2, 1914 |
| 1,759,187 | Davidson | May 29, 1930 |

FOREIGN PATENTS

| Number | Country | Date |
| --- | --- | --- |
| 147,731 | Great Britain | Oct. 10, 1921 |
| 402,567 | Germany | Sept. 19, 1924 |
| 494,713 | France | Sept. 17, 1919 |
| 291,152 | Great Britain | May 24, 1928 |
| 147,475 | Great Britain | Nov. 8, 1921 |
| 15,170 | Great Britain | May 3, 1912 |

Certificate of Correction

Patent No. 2,420,899.     May 20, 1947.

FRANK C. MOCK

It is hereby certified that error appears in the printed specification of the above numbered patent requiring correction as follows:

Column 6, line 62, claim 9, strike out the words "by reason of air flow through the manifold";

and that the said Letters Patent should be read with this correction therein that the same may conform to the record of the case in the Patent Office.

Signed and sealed this 7th day of December, A. D. 1948.

[SEAL]

THOMAS F. MURPHY,
*Assistant Commissioner of Patents.*